(12) United States Patent
Ikeda

(10) Patent No.: US 10,840,826 B2
(45) Date of Patent: Nov. 17, 2020

(54) ELECTROMECHANICAL TRANSDUCER

(71) Applicant: CITIZEN WATCH CO., LTD., Tokyo (JP)

(72) Inventor: Tomoo Ikeda, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 34 days.

(21) Appl. No.: 16/334,751

(22) PCT Filed: Sep. 26, 2017

(86) PCT No.: PCT/JP2017/034776
§ 371 (c)(1),
(2) Date: Mar. 20, 2019

(87) PCT Pub. No.: WO2018/062195
PCT Pub. Date: Apr. 5, 2018

(65) Prior Publication Data
US 2019/0222142 A1 Jul. 18, 2019

(30) Foreign Application Priority Data
Sep. 29, 2016 (JP) ................. 2016-191261

(51) Int. Cl.
*H02N 1/00* (2006.01)
*H02N 1/06* (2006.01)
*H02N 1/08* (2006.01)

(52) U.S. Cl.
CPC .............. *H02N 1/004* (2013.01); *H02N 1/00* (2013.01); *H02N 1/06* (2013.01); *H02N 1/08* (2013.01)

(58) Field of Classification Search
CPC ............ H02N 1/004; H02N 1/08; H02N 1/00; H02N 1/06

(Continued)

(56) References Cited

U.S. PATENT DOCUMENTS 4,897,592 A * 1/1990 Hyde ................. H02N 1/08
310/309
6,784,594 B2 * 8/2004 Kasahara ............ H02N 1/004
310/309

(Continued)

FOREIGN PATENT DOCUMENTS

CN 102246407 A 11/2011
CN 105978395 A 9/2016

(Continued)

OTHER PUBLICATIONS

China National Intellectual Property Administration, Office Action for Chinese Patent Application No. 201780060474.7, dated Sep. 23, 2019.

(Continued)

*Primary Examiner* — John K Kim

(57) ABSTRACT

Provided is an electromechanical transducer including a lightweight and impact-resistant movable member. The electromechanical transducer using electrostatic interaction between charged portions and opposing electrodes to convert between electric power and motive power includes: a movable member having first electrodes and first grooves in a first surface thereof and having second grooves in a second surface opposite to the first surface; and a fixed substrate having second electrodes and facing the first surface of the movable member. One of the first electrodes and the second electrodes are charged portions carrying electrostatic charge while the other of the first electrodes and the second electrodes are opposing electrodes facing the charged portions. The first and second electrodes are each disposed at intervals in a moving direction of the movable member. The first and second grooves do not penetrate the movable member in a thickness direction thereof and are alternately disposed in the moving direction.

10 Claims, 11 Drawing Sheets

(58) Field of Classification Search
USPC .......................................................... 310/309
See application file for complete search history.

(56) References Cited

U.S. PATENT DOCUMENTS

| | | | | |
|---|---|---|---|---|
| 7,166,951 | B2* | 1/2007 | Koga | H02N 1/004 |
| | | | | 310/309 |
| 9,190,936 | B2* | 11/2015 | Naito | H02N 1/00 |
| 2005/0040729 | A1* | 2/2005 | Gondoh | H02N 1/004 |
| | | | | 310/309 |
| 2010/0072855 | A1* | 3/2010 | Matsubara | H02N 1/08 |
| | | | | 310/300 |
| 2012/0169179 | A1* | 7/2012 | Masaki | H01G 7/02 |
| | | | | 310/300 |
| 2013/0076202 | A1 | 3/2013 | Naito et al. | |
| 2018/0026552 | A1 | 1/2018 | Ngata et al. | |
| 2019/0222142 | A1* | 7/2019 | Ikeda | H02N 1/004 |

FOREIGN PATENT DOCUMENTS

| | | |
|---|---|---|
| EP | 2975746 A1 | 1/2016 |
| JP | 2011-078214 A | 4/2011 |
| JP | 5460872 B | 4/2014 |
| JP | 2014-176282 A | 9/2014 |
| JP | 2014-217178 A | 11/2014 |
| JP | 2015-126557 A | 7/2015 |
| JP | 2016-59235 A | 4/2016 |
| JP | 2016-131475 A | 7/2016 |

OTHER PUBLICATIONS

WIPO, International Search Report for PCT/JP2017/034776, dated Dec. 26, 2017.
WIPO, International Preliminary Report on Patentability for PCT/JP2017/034776, dated Dec. 26, 2017.

* cited by examiner (A)

(B)

ELECTROMECHANICAL TRANSDUCER

FIELD

The present invention relates to an electromechanical transducer using electrostatic interaction between charged portions and opposing electrodes to convert between electric power and motive power.

BACKGROUND

Electromechanical transducers are known that use electret, which semi-permanently carrying electric charge, to generate electrostatic interaction, thereby converting between electric power and motive power. For example, Patent Literature 1 describes an electrostatic motor including: a stator having first electrodes made of a conductive material and insulated from each other; and a rotor having second electrodes made of an electret material and insulated from each other. The first electrodes radially extend around the center of the stator and are disposed at intervals in the circumferential direction, while the second electrodes radially extend around the center of rotation and are disposed at intervals in the circumferential direction. The stator and rotor face each other; and a predetermined pattern of voltage is applied to the first electrodes to generate electrostatic Coulomb force between the stator and rotor, thereby rotating the rotor.

Patent Literature 2 describes a power generation device including: a flat rotor generating rotatory power; and first and second power-generating mechanisms respectively provided on one and the other surfaces of the rotor. The first power-generating mechanism includes first electrodes, second electrodes facing the first electrodes, and charge carriers on one of the first and second electrodes, while the second power-generating mechanism includes third electrodes, fourth electrodes facing the third electrodes, and charge carriers on one of the third and fourth electrodes. The power-generating mechanisms cause relative rotation between the first and third electrodes and the second and fourth electrodes to generate variations in electric charge of the charge carriers, and output these variations as electric energy.

In such electromechanical transducers, one of the movable member (rotor) and the fixed substrate (stator) is provided with charged portions while the other is provided with opposing electrodes. Both of the charged portions and opposing electrodes are disposed at intervals in the moving direction of the movable member.

CITATION LIST

Patent Literature

Patent Literature 1: Japanese Unexamined Patent Publication No. 2015-126557
Patent Literature 2: Japanese Unexamined Patent Publication No. 2011-078214

SUMMARY

In order to increase the efficiency of transduction of such electromechanical transducers, it is desirable that the movable member be reduced in weight by forming grooves or through holes in the regions other than the charged portions and opposing electrodes. However, such a movable member, especially if it is made of a brittle material, is more easily broken even by a small impact as the component is smaller in size.

It is an object of the present invention to provide an electromechanical transducer including a lightweight and impact-resistant movable member.

Provided is an electromechanical transducer using electrostatic interaction between charged portions and opposing electrodes to convert between electric power and motive power. The electromechanical transducer includes: a movable member having first electrodes and first grooves in a first surface thereof and having third electrodes and second grooves in a second surface opposite to the first surface; a first fixed substrate having second electrodes and facing the first surface of the movable member; and a second fixed substrate having fourth electrodes and facing the second surface of the movable member. The first and third electrodes are first and second charged portions carrying electrostatic charge while the second and fourth electrodes are first and second opposing electrodes facing the first and second charged portions, respectively; or the first and third electrodes are the first and second opposing electrodes while the second and fourth electrodes are the first and second charged portions, respectively. The first electrodes and the first grooves are alternately disposed in a moving direction of the movable member. The third electrodes and the second grooves are alternately disposed in the moving direction, and respectively alternate with the first electrodes and the first grooves.

Preferably, in the electromechanical transducer, the first and third electrodes are aligned with the second and first grooves, respectively, between both surfaces of the movable member.

Preferably, in the electromechanical transducer, the first electrodes are disposed on first bases provided in the first surface of the movable member while the third electrodes are disposed on second bases provided in the second surface of the movable member; the first and second bases are wider than the first and second grooves in the moving direction; and the first and second bases have edges connected to each other in the moving direction.

Preferably, in the electromechanical transducer, the movable member includes a center layer, first bases on the first surface of the center layer, and second bases on the second surface of the center layer; the first and third electrodes are disposed on the first and second bases, respectively; and the first and second bases are as wide as the first and second grooves in the moving direction.

Provided is an electromechanical transducer using electrostatic interaction between charged portions and opposing electrodes to convert between electric power and motive power. The electromechanical transducer includes: a movable member having first electrodes and first grooves in a first surface thereof and having second grooves in a second surface opposite to the first surface; and a fixed substrate having second electrodes and facing the first surface of the movable member. One of the first electrodes and the second electrodes are charged portions carrying electrostatic charge while the other of the first electrodes and the second electrodes are opposing electrodes facing the charged portions. The first and second electrodes are each disposed at intervals in a moving direction of the movable member. The first and second grooves do not penetrate the movable member in a thickness direction thereof and are alternately disposed in the moving direction.

Preferably, in the electromechanical transducer, the movable member includes first bases which are portions between the first grooves in the first surface, and second bases which are portions between the second grooves in the second surface; the first electrodes are disposed on the first bases; and the first and second bases have edges connected to each other in the moving direction.

Preferably, in the electromechanical transducer, at least one of the first grooves and the second grooves have a depth not less than one half of the thickness of the movable member.

Preferably, in the electromechanical transducer, the movable member includes a center layer, first bases on the first surface of the center layer, and second bases on the second surface of the center layer; and the first electrodes are disposed on the first bases.

Preferably, in the electromechanical transducer, at least one of the first grooves and the second grooves become wider from a center in the thickness direction toward an upper or lower surface of the movable member, in a cross section of the movable member taken along the thickness direction.

Preferably, in the electromechanical transducer, at least one of the first grooves and the second grooves have curved corners.

Preferably, in the electromechanical transducer, the movable member further has third electrodes on the second bases in the second surface; the electromechanical transducer further includes a second fixed substrate facing the second surface of the movable member, the second fixed substrate having fourth electrodes disposed at intervals in the moving direction; and the first and third electrodes are the charged portions while the second and fourth electrodes are the opposing electrodes, or the first and third electrodes are the opposing electrodes while the second and fourth electrodes are the charged portions.

Preferably, in the electromechanical transducer, the first and third electrodes are aligned with the second and first grooves, respectively, between both surfaces of the movable member.

Preferably, in the electromechanical transducer, the movable member is a rotary member rotatable around a rotating shaft; and the charged portions and the opposing electrodes are radially disposed around the rotating shaft.

Preferably, the electromechanical transducer further includes a driving unit applying an alternating voltage to the opposing electrodes to generate electrostatic force between the charged. portions and the opposing electrodes, thereby moving the movable member.

Preferably, the electromechanical transducer further includes a charging unit storing electric power generated by electrostatic induction between the charged portions and the opposing electrodes in response to movement of the movable member.

The movable member of the electromechanical transducer is reduced in weight and improves in impact resistance.

DESCRIPTION OF EMBODIMENTS

Hereinafter, with reference to the accompanying drawings, electromechanical transducers will be explained in detail. However, it should be noted that the present invention is not limited to the drawings or the embodiments described below.

Figure 1:
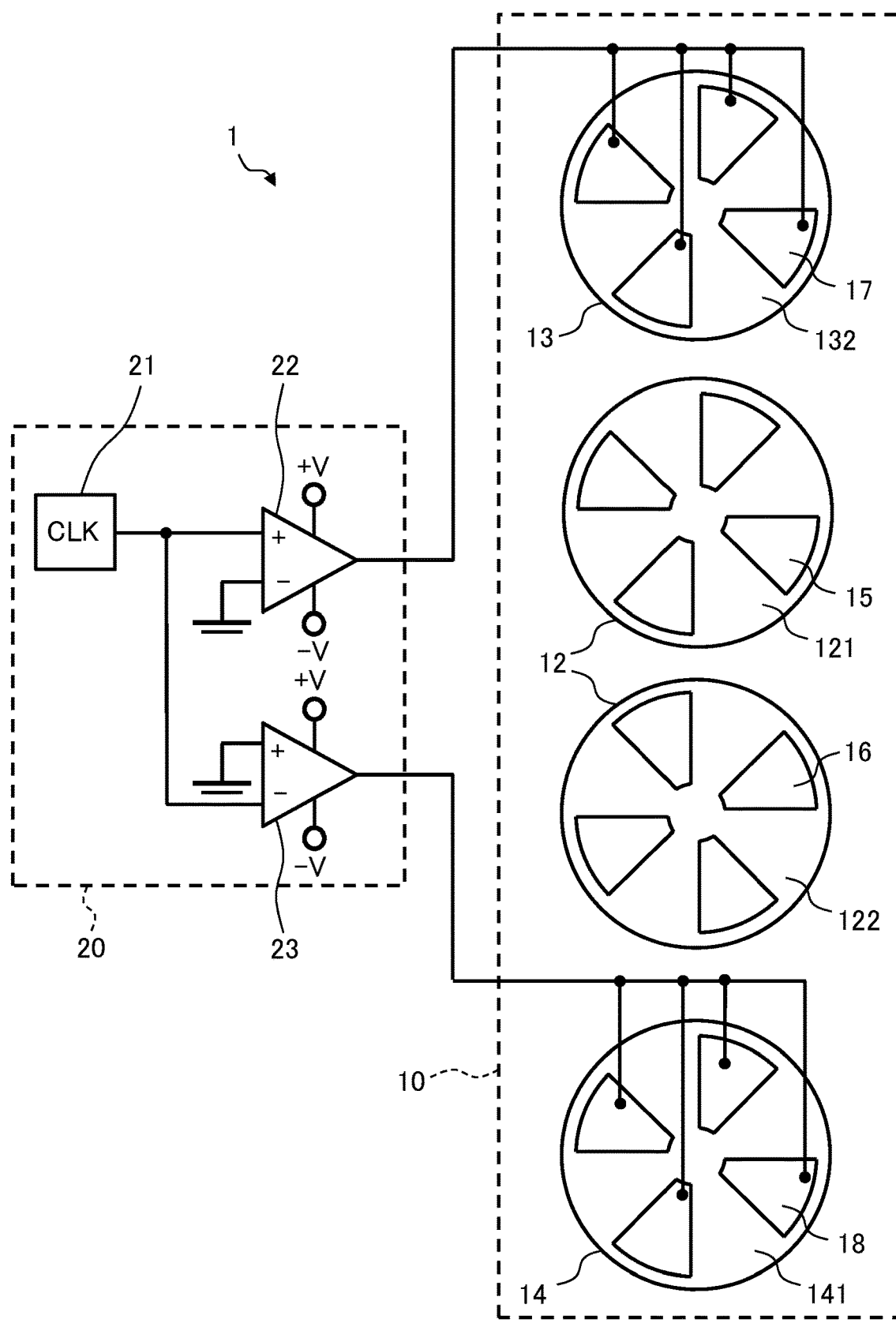
FIG. 1 is a diagram schematically illustrating an electromechanical transducer 1.

FIG. 1 is a diagram schematically illustrating an electromechanical transducer 1. As shown in FIG. 1, the electromechanical transducer 1 includes an actuator 10 and a driving unit 20. Major components of the actuator 10 include a rotary member 12, a fixed substrate 13, a fixed substrate 14, electret portions 15, electret portions 16, opposing electrodes 17 and opposing electrodes 18. The electromechanical transducer 1 is a driver (electret motor) which uses electrostatic force generated between the electret portions 15, 16 and opposing electrodes 17, 18 based on electric signals inputted to the driving unit 20, to rotate the rotary member 12, thereby taking out motive power from electric power.

FIGS. 2(A) and 2(B) are a schematic perspective view and a side view of the actuator 10, respectively. As shown in FIG. 2(A), the actuator 10 is composed of a disk-shaped rotary member 12 sandwiched between two fixed substrates 13, 14. As shown in FIG. 2(B), in the actuator 10, the electret portions 15 and opposing electrodes 17 are paired and disposed on the upper surface 121 side of the rotary member 12 while the electret portions 16 and opposing electrodes 18 are paired and disposed on the lower surface 122 side of the rotary member 12. For simplicity, FIG. 2(B) shows a side view modified so that the lateral direction of the figure corresponds to the circumferential direction (direction of arrow C in FIG. 2(A)) of the rotary member 12 and fixed substrates 13, 14. As the actuator 10, FIG. 1 shows the lower surface 132 of the fixed substrate 13, the upper surface 121 and lower surface 122 of the rotary member 12, and the upper surface 141 of the fixed substrate 14, which are arranged in this order from top to bottom of the figure.

The rotating shaft 11 shown in FIG. 2(A) is a center axis of rotation of the rotary member 12, and pierces the center of the rotary member 12. The upper and lower ends of the rotating shaft 11 are fixed to a housing (not shown) of the electromechanical transducer 1 with bearings. In FIGS. 1 and 2(B), the rotating shaft 11 is omitted from illustration.

The rotary member 12 is an example of the movable member, and is made of a well-known substrate material, such as glass or silicon (Si). As shown in FIG. 2(A), the rotary member 12 has a disk shape, for example, and is connected at its center to the rotating shaft 11. The rotary member 12 can be rotated around the rotating shaft 11 in the direction of arrow C of FIG. 2(A) (i.e., clockwise and anticlockwise) by electrostatic force generated between the electret portions 15, 16 and opposing electrodes 17, 18 in response to electric signals inputted to the driving unit 20.

The fixed substrates 13, 14 are an example of the first and second fixed substrates, and are made of a well-known substrate material, such as a glass epoxy substrate. As shown in FIG. 2(A), the fixed substrates 13, 14 each have a disk shape, for example. The fixed substrate 13 is disposed above the rotary member 12 so as to face the upper surface 121 (first surface) thereof, while the fixed substrate 14 is disposed below the rotary member 12 so as to face the lower surface 122 (second surface) thereof. Although their centers are pierced by the rotating shaft 11, the fixed substrates 13, 14 are fixed to the housing of the electromechanical transducer 1, unlike the rotary member 12.

The electret portions 15 are an example of the first electrodes and first charged portions while the electret portions 16 are an example of the third electrodes and second charged portions. These are charged portions carrying electrostatic charge, and each have a substantially trapezoidal shape, as shown in FIG. 1. As shown in FIGS. 1 and 2(B), the electret portions 15, 16 are formed on the upper surface 121 and lower surface 122 of the rotary member 12, respectively. Around the rotating shaft 11, the electret portions 15, 16 are radially disposed and evenly spaced in the rotating direction (circumferential direction, direction of arrow C) of the rotary member 12. As shown in FIG. 2(B), the electret portions 15, 16 of the actuator 10 are alternately disposed in the circumferential direction.

The opposing electrodes 17 are an example of the second electrodes and first opposing electrodes while the opposing electrodes 18 are an example of the fourth electrodes and second opposing electrodes. As shown in FIG. 1, these electrodes each have a substantially trapezoidal shape, similarly to the electret portions 15, 16. The opposing electrodes 17 are formed on the lower surface 132 of the fixed substrate 13 so as to face the electret portions 15, while the opposing electrodes 18 are formed on the upper surface 141 of the fixed substrate 14 so as to face the electret portions 16. The opposing electrodes 17, 18 are also radially disposed and evenly spaced in the circumferential direction around the rotating shaft 11. As shown in FIG. 2(B), the opposing electrodes 17, 18 of the actuator 10 are aligned with each other in the circumferential direction.

The number of electret portions 15 (charged portions) is equal to that of opposing electrodes 17, and the number of electret portions 16 (charged portions) is also equal to that of opposing electrodes 18. Although only four electret portions 15, 16 and four opposing electrodes 17, 18 are shown in FIGS. 1 and 2(B), these are actually a larger number of electrodes (charged portions).

The driving unit 20 is a circuit for driving the actuator 10, and includes a clock 21 and comparators 22, 23. The driving unit 20 applies an alternating voltage to the opposing electrodes 17, 18 to generate electrostatic force between the electret portions 15 and opposing electrodes 17 and between the electret portions 16 and opposing electrodes 18, thereby rotating the rotary member 12.

As shown in FIG. 1, the output of the clock 21 is connected to inputs of the comparators 22, 23, and the outputs of the comparators 22, 23 are connected to the opposing electrodes 17, 18, respectively, through electric wiring. The comparators 22, 23 each compare the electric potential of an input signal from the clock 21 with the ground potential, and output its result as a binary signal; the output signals from the comparators 22, 23 are of opposite sign. When the input signal from the clock 21 is H, the opposing electrodes 17, 18 have electric potential of +V and −V, respectively. When the input signal is 1, the opposing electrodes 17, 18 have electric potential of −V and +V, respectively.

When the actuator 10 is driven, the driving unit 20 energizes the opposing electrodes 17, which are aligned with the electret portions 15 in the circumferential direction in FIG. 2(B), with a voltage of the same sign as the electric charge of the electret portions 15. At this time, the other opposing electrodes 18 are displaced from the other electret portions 16 in the circumferential direction. The driving unit 20 energizes the opposing electrodes 18 with a voltage of the sign opposite to the electric charge of the electret portions 16. FIG. 2(B) shows the state where the electret portions 15, 16 are negatively charged and the opposing electrodes 17, 18 are energized with negative and positive voltages, respectively. In this way, the driving unit 20 applies an alternating voltage across the opposing electrodes 17, 18, thereby rotating the rotary member 12.

Figure 2:
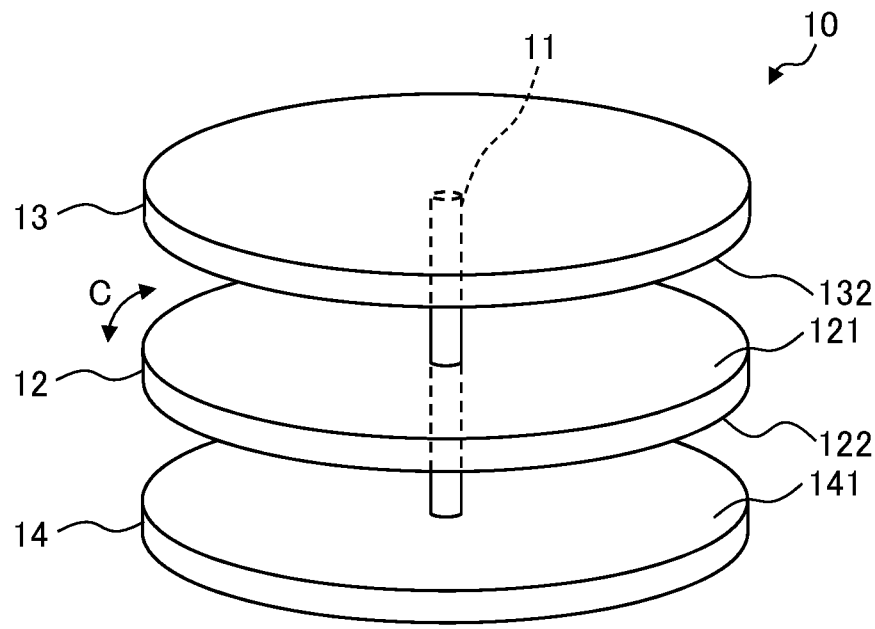
FIGS. 2(A) and 2(B) are a schematic perspective view and a side view of the actuator 10, respectively.
Figure 2:
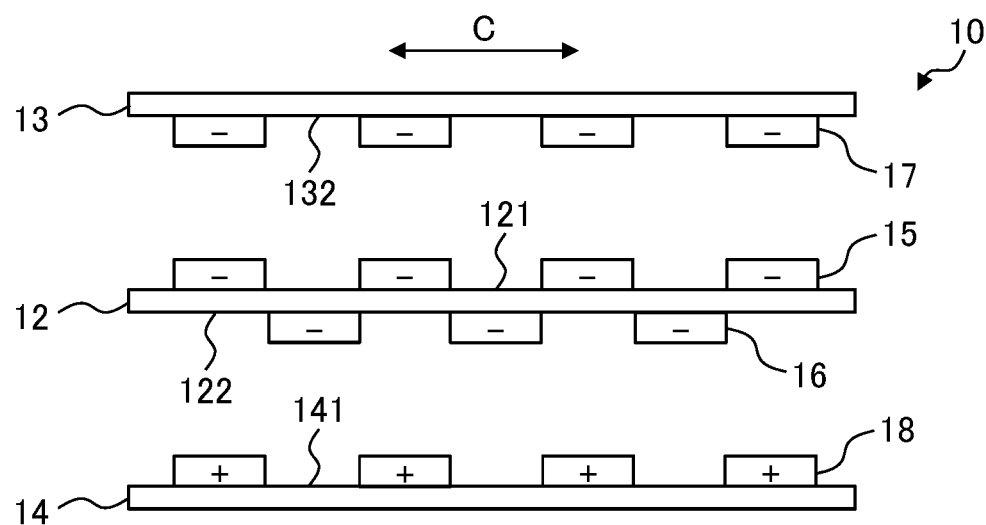

Next, the structure of the rotary member 12 shown in FIGS. 1 to 2(B) is described in detail.

Figure 3:
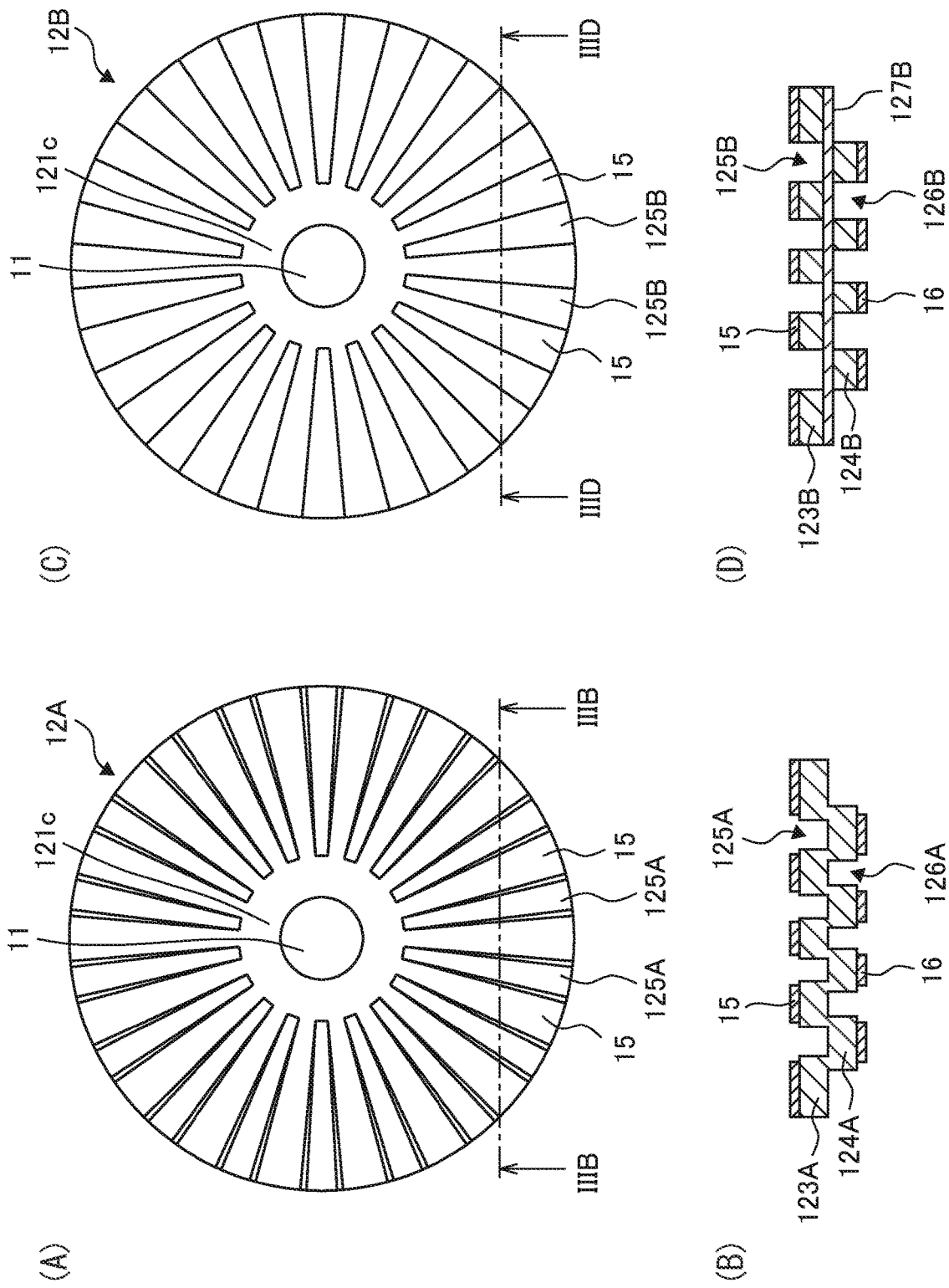
FIGS. 3(A) to 3(D) are top plan views and cross-sectional views of rotary members 12A, 12B.

FIGS. 3(A) to 3(D) are top plan views and cross-sectional views of rotary members 12A, 12B. FIG. 3(A) shows the upper surface of the rotary member 12A while FIG. 3(B) shows a cross section of the rotary member 12A taken along line IIIB-IIIB in FIG. 3(A). FIG. 3(C) shows the upper surface of the rotary member 12B while FIG. 3(D) shows a cross section of the rotary member 12B taken along line IIID-IIID in FIG. 3(C). The rotary members 12A, 12B may be used as the rotary member 12 of the actuator 10.

As shown in FIGS. 3(A) and 3(B), the rotary member 12A includes bases 123A and grooves 125A in the upper surface 121, and bases 124A and grooves 126A in the lower surface 122; these bases and grooves are formed alternately in the circumferential direction. The bases 123A, 124A are an example of the first and second bases, and are portions between the grooves 125A and between the grooves 126A, respectively. The grooves 125A, 126A are an example of the first and second grooves, and are recesses formed by etching the substrate of the rotary member 12A. The depth of the grooves is about one half of the thickness of the substrate of the rotary member 12A; none of the grooves 125A, 126A penetrates the rotary member 12A in the thickness direction.

The rotary member 12A includes electret portions 15, 16 on the bases 123A, 124A, respectively. In other words, in the rotary member 12A, the electret portions 15 and grooves 125A are alternately disposed in the rotating direction (circumferential direction) of the rotary member 12A, and so are the electret portions 16 and grooves 126A. Further, in the rotary member 12A, the electret portions 16 and grooves 126A respectively alternate with the electret portions 15 and grooves 125A. More specifically, the electret portions 15, 16 are aligned with the grooves 126A, 125A, respectively, between both surfaces of the rotary member 12A. Thus, the electret portions 15, 16 of the rotary member 12A are alternately disposed in the circumferential direction.

The bases 123A, 124A have the same shape and size, and so do the grooves 125A, 126A. As shown in FIG. 3(B), the bases 123A, 124A of the rotary member 12A have edges connected to each other in the circumferential direction. Thus, in the rotary member 12A, the bases 123A, 124A are wider in the circumferential direction than the grooves 125A, 126A, on the same circumference centered at the rotating shaft 11.

As for the electret portions 15, 16, portions where the electret portions 15, 16 are disposed are as wide as portions where they are not disposed, on the same circumference.

Thus, as shown in FIG. 3(B), the electret portions 15, 16 are narrower than the bases 123A, 124A on the same circumference; the electret portions 15, 16 are not disposed on edges of the bases 123A, 124A adjacent in the circumferential direction. In other words, the edges of the electret portions 15, 16 adjacent in the circumferential direction are slightly displaced from those of the bases 123A, 124A.

The rotary member 12A includes an annular center portion 121c enclosing the rotating shaft 11 on the upper and lower surfaces. This center portion is a flat region having neither electret portions nor grooves formed thereon. The same applies to all rotary members described later.

The rotary member 12B is made of an SOI (Silicon on Insulator) substrate. As shown in FIGS. 3(C) and 3(D), the rotary member 12B includes a center layer 127B, bases 123B, grooves 125B, bases 124B and grooves 126B. The center layer 127B corresponds to the $SiO_2$ layer included in the SOI substrate. The bases 123B are an example of the first bases, and are evenly spaced in the circumferential direction on the upper surface of the center layer 127B. The grooves 125B are an example of the first grooves, and correspond to regions on the upper surface of the center layer 127B where the bases 123B are not formed. The bases 124B are an example of the second bases, and are evenly spaced in the circumferential direction on the lower surface of the center layer 127B. The grooves 126B are an example of the second grooves, and correspond to regions on the lower surface of the center layer 127B where the bases 124B are not formed.

The rotary member 12B includes electret portions 15, 16 on the bases 123B, 124B, respectively. In other words, in the rotary member 12B also, the electret portions 15 and grooves 125B are alternately disposed in the rotating direction (circumferential direction) of the rotary member 12B, and so are the electret portions 16 and grooves 126B. In the rotary member 12B also, the electret portions 16 and grooves 126B respectively alternate with the electret portions 15 and grooves 125B, similarly to the rotary member 12A. Thus, the electret portions 15, 16 of the rotary member 12B are also alternately disposed in the circumferential direction.

The bases 123B, 124B have the same shape and size, and so do the grooves 125B, 126B. However, in the rotary member 12B, unlike the rotary member 12A, the bases 123B, 124B are as wide as the grooves 125B, 126B in the circumferential direction, on the same circumference. In other words, in the rotary member 12B, the edges of the electret portions 15, 16 adjacent in the circumferential direction are aligned with those of the bases 123A, 124A.

For example, the diameter of each rotary member 12A, 12B is about 5 to 20 mm. For example, the thickness of the substrate portion of each rotary member 12A, 12B other than the electret portions 15, 16 is about 100 to 500 µm, and the thickness of each electret portion 15, 16 is about 15 to 20 µm. These dimensions also apply to all rotary members described later. For example, the thickness of the center layer 127B of the rotary member 12B is about 5 µm.

Figure 4:
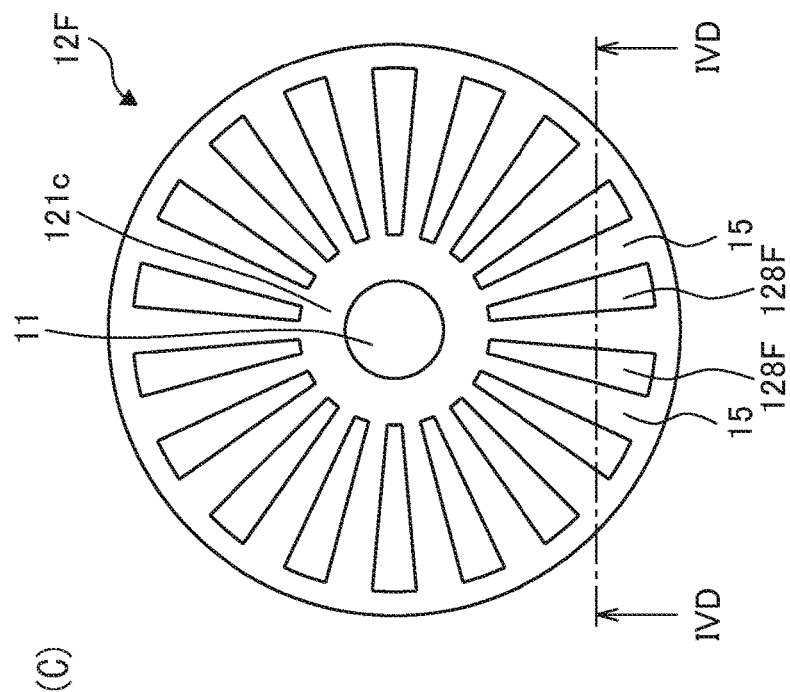
FIGS. 4(A) to 4(D) are top plan views and cross-sectional views of rotary members 12E, 12F of comparative examples.
Figure 4:
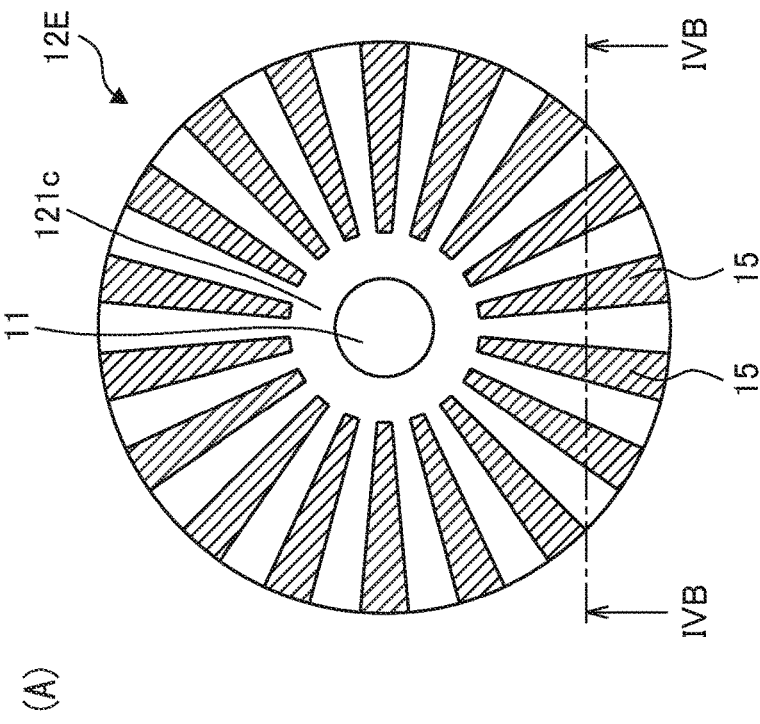
Figure 4:

FIGS. 4(A) to 4(D) are top plan views and cross-sectional views of rotary members 12E, 12F of comparative examples. FIG. 4(A) shows the upper surface of the rotary member 12E while FIG. 4(3) shows a cross section of the rotary member 12E taken along line IVB-IVB in FIG. 4(A). FIG. 4(C) shows the upper surface of the rotary member 12F while FIG. 4(D) shows a cross section of the rotary member 12F taken along line IVD-IVD in FIG. 4(C).

As shown in FIGS. 4(A) and 4(B), the rotary member 12E includes electret portions 15, 16 on the upper and lower surfaces thereof, respectively, similarly to the rotary members 12A, 12B. These electret portions are radially disposed and evenly spaced in the circumferential direction around the rotating shaft 11. However, the rotary member 12E is made of a flat substrate without any grooves, unlike the rotary members 12A, 12B. The electret portions 15, 16 of the rotary member 12E are aligned with each other in the circumferential direction.

As shown in FIGS. 4(C) and 4(D), the rotary member 12F includes electret portions 15, 16 on the upper and lower surfaces thereof, respectively, similarly to the rotary members 12A, 12B. These electret portions are radially disposed and evenly spaced in the circumferential direction around the rotating shaft 11. The electret portions 15, 16 of the rotary member 12F are also aligned with each other in the circumferential direction. For the purpose of weight reduction, the rotary member 12F includes substantially trapezoidal through holes 128F in regions where the electret portions 15, 16 are not formed; these through holes are evenly spaced in the circumferential direction.

Since lack of through holes and grooves makes the rotary member 12E heavier and less easy to rotate, the rotary member 12F is more desirable than the rotary member 12E. However, in the rotary member 12F, portions where the electret portions 15, 16 are formed between the through holes 128F are narrow. Thus, if the rotary member is made of a brittle material, such as ceramics, glass or silicon, the shape of the rotary member 12F has a problem that especially the center portion near the rotating shaft 11 is easily broken. The grooves 125A, 125B, 126A, 126B make the rotary members 12A, 12B lighter in weight than a rotary member without these grooves. Further, in the rotary members 12A, 12B, the electret portions 15 and grooves 125A, 125B respectively alternate with the electret portions 16 and grooves 126A, 126B. Thus, even if the rotary member is made of a brittle material, such as ceramics, glass or silicon, it is less easily broken than a rotary member whose both surfaces include grooves aligned with each other in the circumferential direction. Accordingly, the rotary members 12A-12B improve in impact resistance, which allows the electret motor to improve in reliability and manufacturing handleability.

In the rotary members 12A, 12B, the electret portions 15, 16 are alternately disposed in the circumferential direction while the opposing electrodes 17, 18 are aligned with each other in the circumferential direction. In other words, in the rotary members 12A, 12B, only the electret portions 16 out of the electret portions 15, 16 and opposing electrodes 17, 18 are displaced by a half of the pitch with respect to the electret portions 15. Thus, during rotation of the rotary members 12A, 12B, electrostatic force between the electret portions 15 and opposing electrodes 17 and electrostatic force between the electret portions 16 and opposing electrodes 18 are alternately generated, which produces continuous motive power. Accordingly, use of the rotary member 12A or 12B allows the electret motor to smoothly rotate.

In general, electrostatic charge retained in electret may be lost under humid environments due to moisture in the air. However, the rotary members 12A, 12B have the characteristic that the electret portions 15, 16 are less likely to lose electrostatic charge and to deteriorate with time than the rotary members 12E, 12F.

Next, how to manufacture the rotary members is described in sequence.

FIGS. 5(A) to 5(E) are cross-sectional views for explaining a process for manufacturing the rotary member 12A. For simplicity, these and the following cross-sectional views used for explaining the manufacturing processes are modified so that the lateral direction of each figure corresponds to the circumferential direction (direction of arrow C in FIG. 2(A)) of the corresponding rotary member.

Figure 5:
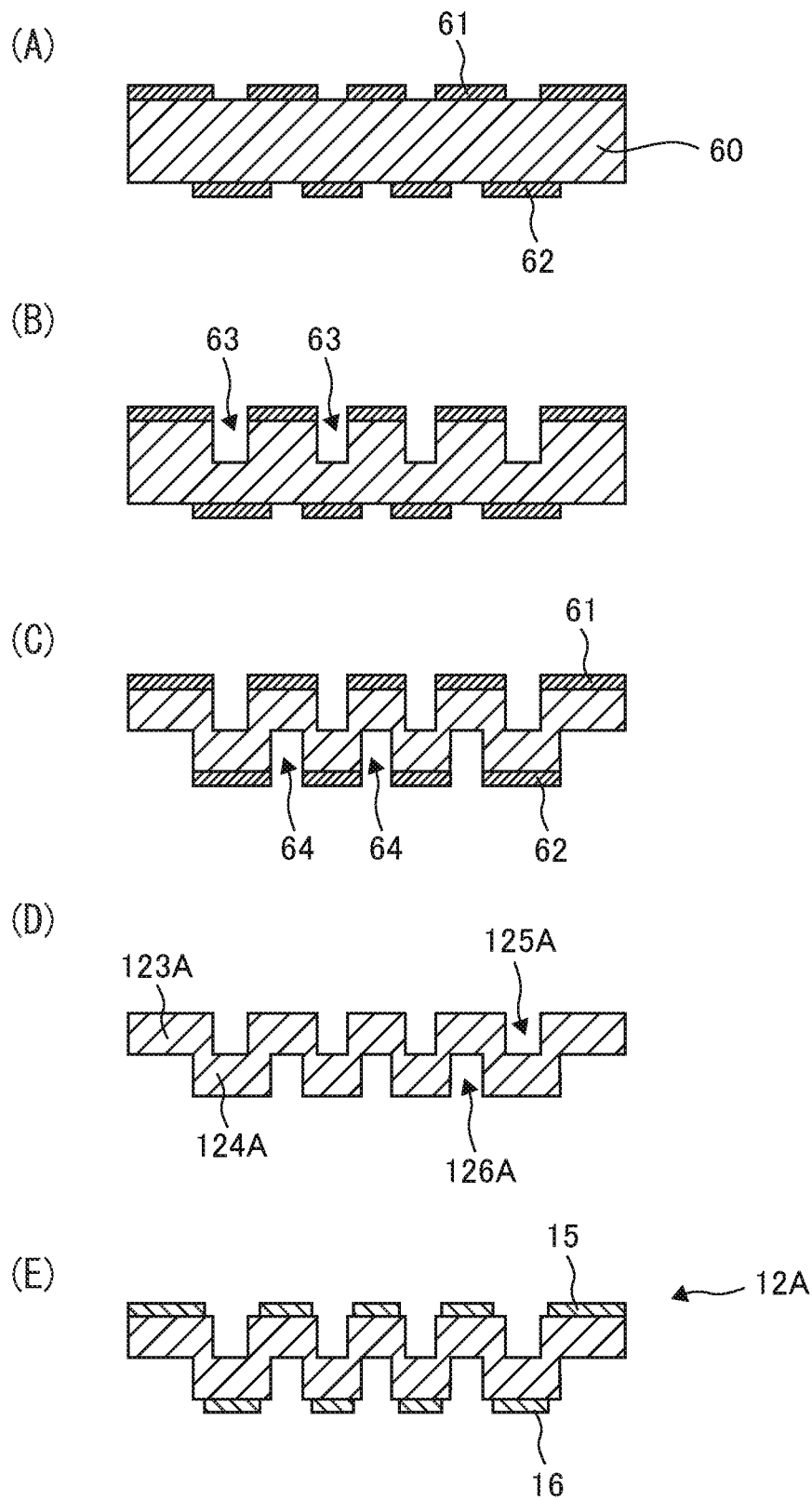
FIGS. 5(A) to 5(E) are cross-sectional views for explaining a process for manufacturing the rotary member 12A.

In manufacturing the rotary member 12A, first, as shown in FIG. 5(A), patterned mask layers 61, 62, such as a resist or SiO$_2$, are respectively formed on the upper and lower surfaces of a Si or glass substrate 60 by photolithography or electron-beam machining. Next, as shown in FIGS. 5(B) and 5(C), both surfaces of the substrate 60 are cut by deep reactive-ion etching or blasting to form grooves 63 and grooves 64 in the upper and lower surfaces, respectively.

Thereafter, as shown in FIG. 5(D), the mask layers 61, 62 are removed. The grooves 63, 64 correspond to the grooves 125A, 126A of FIG. 3(B), while the portions on the upper and lower sides of the substrate 60 which remain without being removed correspond to the bases 123A, 124A, respectively. In this state, electret films are applied on the upper and lower surfaces of the substrate 60 by printing or inkjet printing to form the electret portions 15, 16. The rotary member 12A shown in FIGS. 3(A) and 3(B) is manufactured by these steps.

Figure 6:
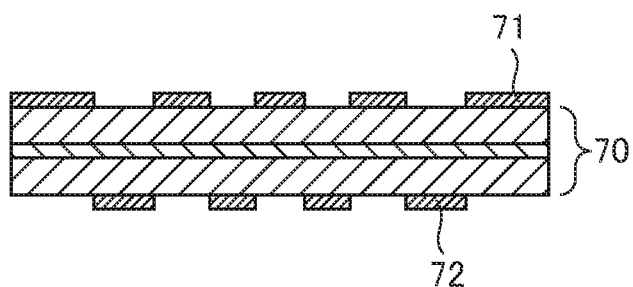
FIGS. 6(A) to 6(E) are cross-sectional views for explaining a process for manufacturing the rotary member 12B.
Figure 6:
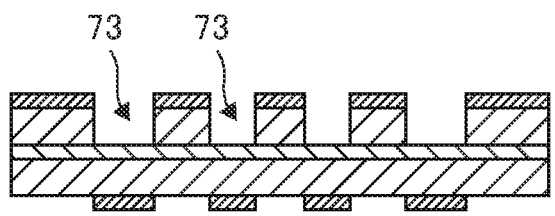
Figure 6:
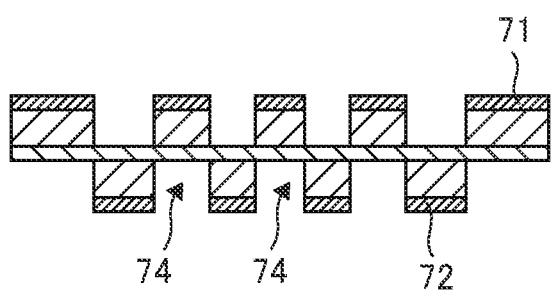
Figure 6:
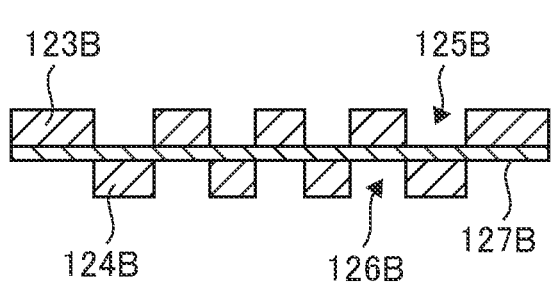
Figure 6:
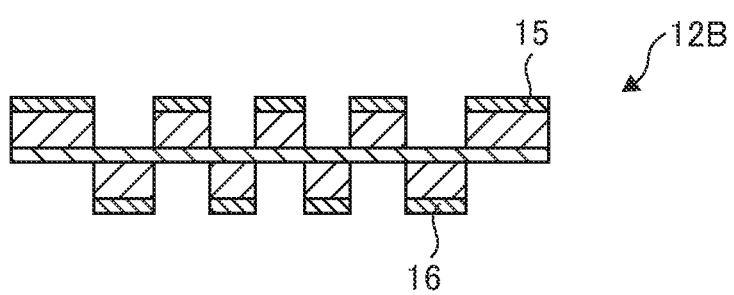

FIGS. 6(A) to 6(E) are cross-sectional views for explaining a process for manufacturing the rotary member 12B. In manufacturing the rotary member 12B, first, as shown in FIG. 6(A), patterned mask layers 71, 72, such as a resist or SiO$_2$, are respectively formed on the upper and lower surfaces of an SOI substrate 70 by photolithography or electron-beam machining. Next, as shown in FIGS. 6(B) and 6(C), both surfaces of the SOI substrate 70 are cut by deep reactive-ion etching or blasting to form grooves 73 and grooves 74 in the upper and lower surfaces, respectively.

Thereafter, as shown in FIG. 6(D), the mask layers 71, 72 are removed. The grooves 73, 74 correspond to the grooves 125B, 126B of FIG. 3(D), while the portions on the upper and lower sides of the SOI substrate 70 which remain without being removed correspond to the bases 123B, 124B, respectively. The SiO$_2$ layer inside the SOI substrate 70 corresponds to the center layer 127B. In this state, electret films are applied on the bases 123B, 124B by printing or inkjet printing to form the electret portions 15, 16. The rotary member 12B shown in FIGS. 3(C) and 3(D) is manufactured by these steps.

FIGS. 7(A) to 7(F) are cross-sectional views for explaining another process for manufacturing the rotary member 12B. The rotary member 12B can also be manufactured by the following steps.

Figure 7:
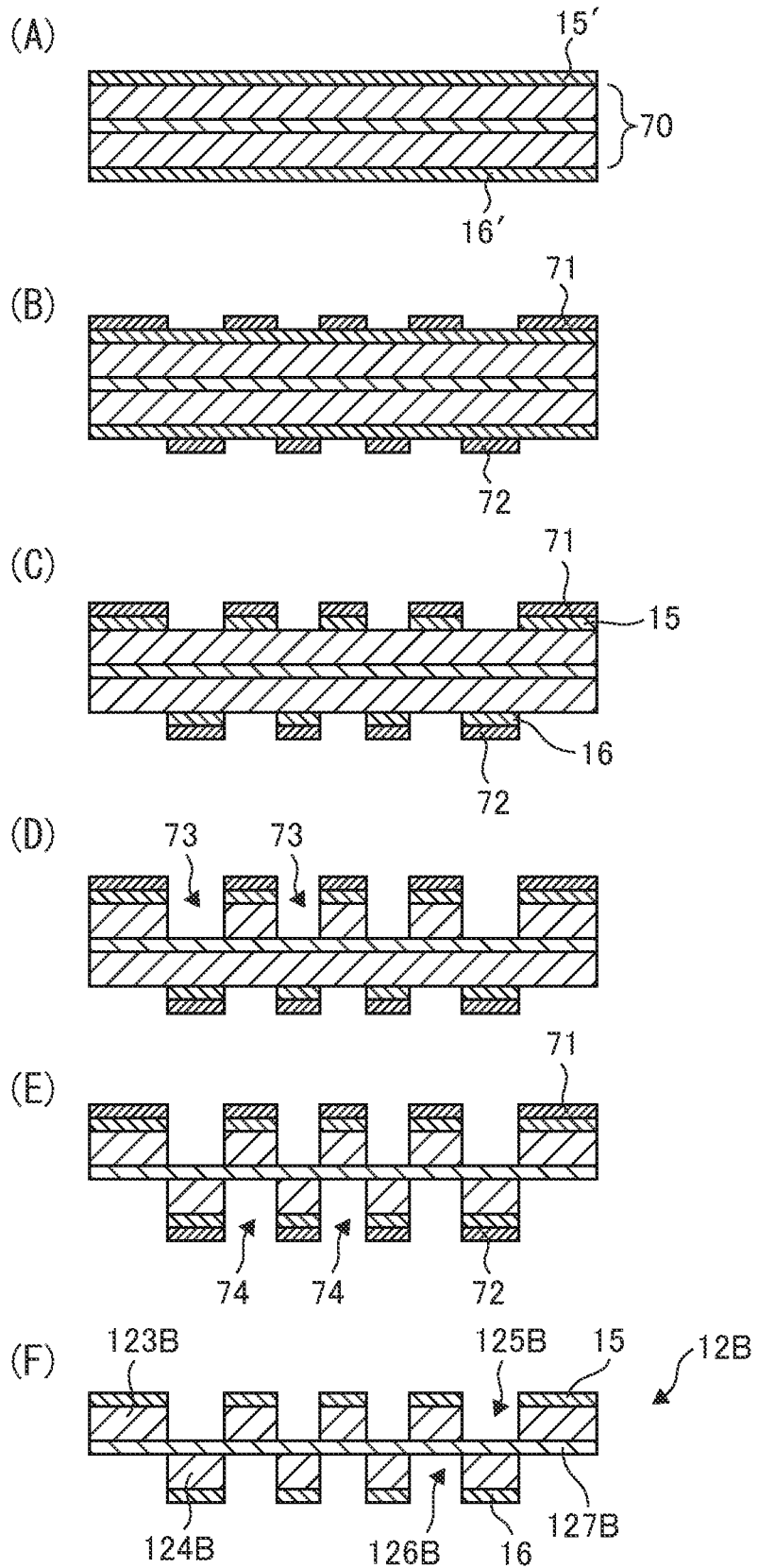
FIGS. 7(A) to 7(F) are cross-sectional views for explaining another process for manufacturing the rotary member 12B.

First, as shown in FIG. 7(A), electret films 15', 16' are applied by brushing or spraying on the upper and lower surfaces of an SOI substrate 70, respectively. Next, as shown in FIG. 7(B), patterned mask layers 71, 72, such as a resist, are respectively formed on the electret films 15', 16' by photolithography. Subsequently, as shown in FIG. 7(C), the electret films 15', 16' are partially removed by ashing from the regions where the mask layers 71, 72 are not formed, thereby subjecting the electret films 15', 16' to patterning to form the electret portions 15, 16.

Further, as shown in FIGS. 7(D) and 7(E), the SOI substrate 70 on the portions where the mask layers 71, 72 are not formed are cut by deep reactive-ion etching to form grooves 73 and grooves 74 in the upper and lower surfaces, respectively. Finally, as shown in FIG. 7(F), the mask layers 71, 72 are removed. The rotary member 12B shown in FIGS. 3(C) and 3(D) is also manufactured by these steps.

Figure 8:
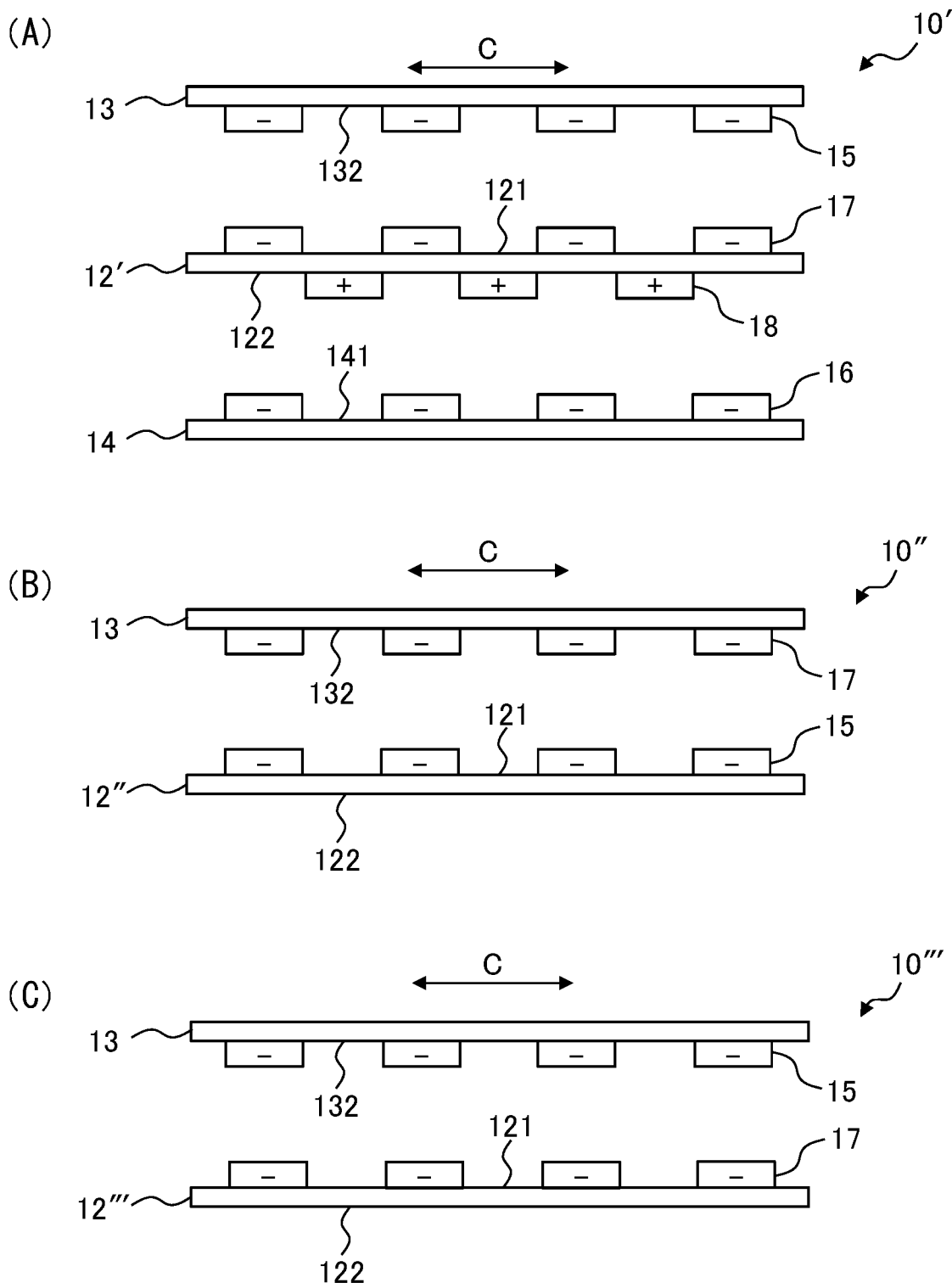
FIGS. 8(A) to 8(C) are schematic side views of actuators 10', 10", 10''', respectively.

FIGS. 8(A) to 8(C) are schematic side views of actuators 10', 10'', 10''', respectively. Similarly to FIG. 2(B), these figures are side views modified so that the lateral direction of each figure corresponds to the circumferential direction (direction of arrow C) of the corresponding rotary member.

The actuator 10' shown in FIG. 8(A) is identical in structure to the actuator 10 shown in FIG. 2(B) except that the electret portions 15, 16 and opposing electrodes 17, 18 change places. As in the actuator 10', the electret portions 15, 16 and opposing electrodes 17, 18 may be disposed on the lower surface 132 of the fixed substrate 13, the upper surface 141 of the fixed substrate 14, and the upper surface 121 and lower surface 122 of the rotary member 12, respectively.

In the actuator 10', the opposing electrodes 17, 18 respectively correspond to the first and third electrodes while the electret portions 15, 16 respectively correspond to the second and fourth electrodes. In the actuator 10', the electret portions 15, 16 are aligned with each other in the rotating direction (circumferential direction, direction of arrow C) of the rotary member 12 while the opposing electrodes 17, 18 are alternately disposed in the circumferential direction. As its rotary member 12', the actuator 10' may include a rotary member which is the same as the rotary member 12A or 12B shown in FIGS. 3(A) to 3(D) except that the electret portions 15, 16 are replaced with the opposing electrodes 17, 18, respectively.

The actuator 10'' shown in FIG. 8(B) includes a rotary member 12'', a fixed substrate 13, electret portions 15 and opposing electrodes 17. The actuator 10'' is identical in structure to the actuator 10 except that the fixed substrate 14, electret portions 16 and opposing electrodes 18 are omitted. Although it produces smaller motive power than the actuator 10, only one side of the rotary member may include a pair of electret portions and opposing electrodes, as in the actuator 10''. As its rotary member 12'', the actuator 10'' may include a rotary member which is the same as the rotary member 12A or 12B except that the electret portions 16 are not formed on the surface (lower surface 122) opposite to the fixed substrate 13. Then, reduction in weight and improvement in impact resistance of the rotary member can be achieved even in the actuator including a pair of electret portions and opposing electrodes only on one side of the rotary member.

The actuator 10''' shown in FIG. 8(C) is identical in structure to the actuator 10'' except that the electret portions 15 and opposing electrodes 17 change places. If the actuator includes a pair of electret portions and opposing electrodes only on one side of the rotary member, the electret portions 15 and opposing electrodes 17 may be disposed on the lower surface 132 of the fixed substrate 13 and the upper surface 121 of the rotary member 12''', respectively, as in the actuator 10'''. As its rotary member 12', the actuator 10''' may include a rotary member which is the same as the rotary member 12A or 12B except that the electret portions 15 are replaced with the opposing electrodes 17 and that the electret portions 16 are not formed.

Figure 9:
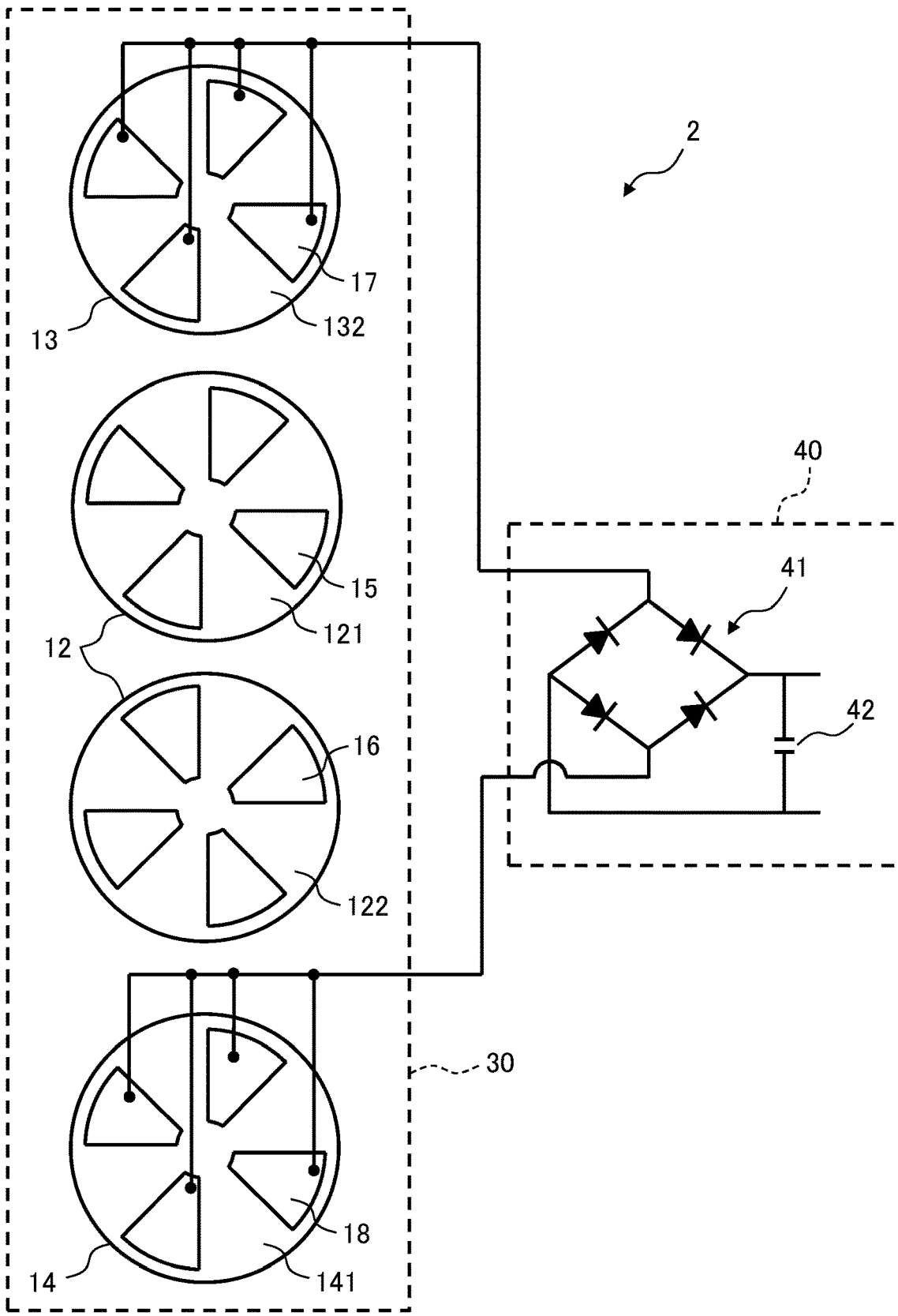
FIG. 9 is a diagram schematically illustrating an electromechanical transducer 2.

FIG. 9 is a diagram schematically illustrating an electromechanical transducer 2. As shown in FIG. 9, the electromechanical transducer 2 includes a power-generating unit 30 and a charging unit 40. Similarly to the actuator 10, major components of the power-generating unit 30 include a rotary member 12, a fixed substrate 13, a fixed substrate 14, electret portions 15, electret portions 16, opposing electrodes 17 and opposing electrodes 18. The electromechanical transducer 2 is an electric generator (electret power generator) which rotates the rotary member 12 with kinetic energy of the external environment, to cause electrostatic induction and generate static electricity in the power-generating unit 30, thereby taking out electric power from motive power.

The rotary member 12, fixed substrates 13, 14, electret portions 15, 16 and opposing electrodes 17, 18 are the same as those in the actuator 10. However, the rotary member 12 of the power-generating unit 30 is provided with a rotary weight (not shown) having an uneven weight balance, for example. The opposing electrodes 17, 18 of the electromechanical transducer 2 are connected to the charging unit 40 through electric wiring. The power-generating unit 30 uses, as its power source, motions of a human carrying the electromechanical transducer 2 or vibrations of a machine provided with the electromechanical transducer 2, for example, thereby rotating the rotary member 12 with the rotary weight in the circumferential direction thereof.

The rotation of the rotary member 12 increases and decreases the overlapping area between the electret portions 15, 16 and opposing electrodes 17, 18. If the electret portions 15, 16 retain negative charge therein, for example, the rotation of the rotary member 12 increases and decreases positive charge attracted to the opposing electrodes 17, 18, thereby generating an alternating current between the opposing electrodes 17, 18. The power-generating unit 30 generates a current in this manner by electrostatic induction to generate electric power.

The charging unit 40 includes a rectifier circuit 41 and a storage battery 42, and stores electric power generated by electrostatic induction between the electret portions 15, 16 and opposing electrodes 17, 18 in response to the rotation of the rotary member 12. The outputs of the opposing electrodes 17, 18 are connected to the rectifier circuit 41, which is connected to the storage battery 42. The rectifier circuit 41 is a bridge circuit including four diodes, and rectifies the current generated between the opposing electrodes 17, 18. The storage battery 42 is a chargeable and dischargeable battery, such as a lithium-ion battery, stores the electric power generated by the power-generating unit 30, and supplies the electric power to a circuit (not shown) to be driven.

In the power-generating unit 30 also, the rotary member 12A or 12B is used as the rotary member 12. Then, reduction in weight and improvement in impact resistance of the rotary member 12 can be achieved even in the power-generating unit 30.

Figure 10:
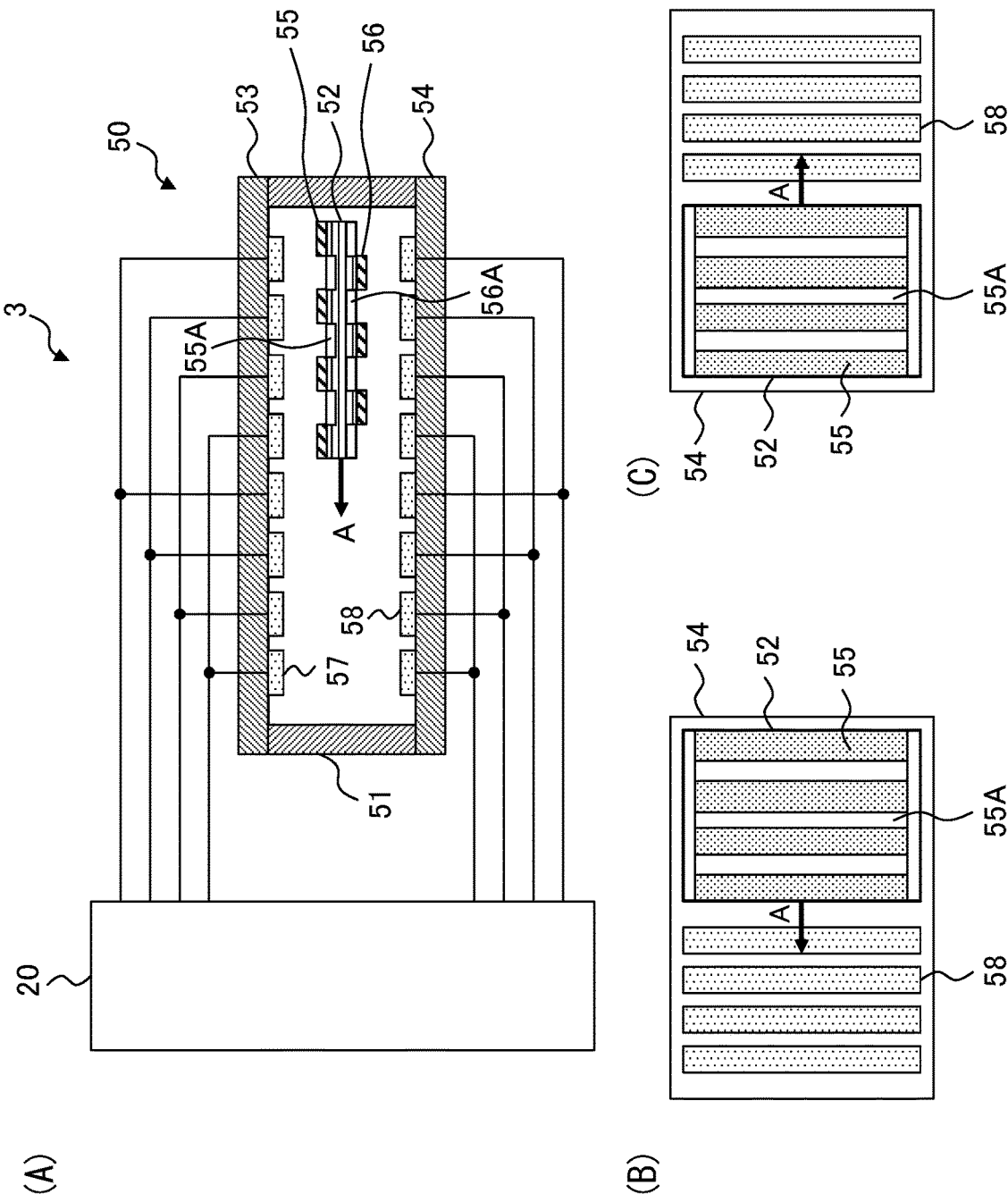
FIGS. 10(A) to 10(C) are diagrams schematically illustrating an electromechanical transducer 3.

FIGS. 10(A) to 10(C) are diagrams schematically illustrating an electromechanical transducer 3. As shown in FIG. 10(A), the electromechanical transducer 3 includes an actuator 50 and a driving unit 20. Major components of the actuator 50 include a housing 51, a sliding board 52, a fixed substrate 53, a fixed substrate 54, electret portions 55, electret portions 56, opposing electrodes 57 and opposing electrodes 58. FIGS. 10(B) and 10(C) are plan views showing the arrangement of the electret portions 55, 56 and opposing electrodes 57, 58, and the moving direction of the sliding board 52.

The electromechanical transducer 3 is a driver which uses electrostatic force generated between the electret portions 55, 56 and opposing electrodes 57, 58 based on electric signals inputted to the driving unit 20, to reciprocate the sliding board 52, thereby taking out motive power from electric power. The movable member of the electromechanical transducer is not limited to a rotor, such as the rotary member 12 of the electromechanical transducers 1, 2, but may be one reciprocating in a sliding fashion, such as the sliding board 52 of the electromechanical transducer 3.

As shown in FIG. 10(A), the fixed substrates 53, 54 are disposed on the upper and bottom surfaces of the box-shaped housing 51, respectively. The sliding board 52 is an example of the movable member, is supported in the housing 51 by a movable-member supporter (not shown), and can reciprocate between the fixed substrates 53, 54 in a direction (horizontal direction) parallel to the fixed substrates 53, 54. The sliding board 52 includes grooves 55A and grooves 56A in the upper and lower surfaces thereof, respectively. These grooves are disposed at intervals in the moving direction (direction of arrow A) of the sliding board 52, and are formed into strips extending in a direction perpendicular to the moving direction. The grooves 55A, 56A are an example of the first and second grooves, and are recesses formed by etching the substrate of the sliding board 52. None of these grooves penetrates the sliding board 52 in the thickness direction.

The electret portions 55 are an example of the first electrodes and first charged portions while the electret portions 56 are an example of the third electrodes and second charged portions. As shown in FIGS. 10(A) to 10(C), the electret portions 55, 56 are respectively formed on the regions of the upper and lower surfaces of the sliding board 52 where the grooves 55A, 56A are not formed. These electret portions are disposed at intervals in the moving direction of the sliding board 52, and are formed into strips extending in a direction perpendicular to the moving direction. In the sliding board 52 of the actuator 50, the electret portions 55 and grooves 55A respectively alternate with the electret portions 56 and grooves 56A. Then, reduction in weight and improvement in impact resistance of the sliding board 52 can be achieved even in the actuator 50.

The opposing electrodes 57 are an example of the second electrodes and first opposing electrodes while the opposing electrodes 58 are an example of the fourth electrodes and second opposing electrodes. As shown in FIG. 10(A), the opposing electrodes 57, 58 are respectively formed on the lower surface of the fixed substrate 53 and the upper surface of the fixed substrate 54. These opposing electrodes are disposed at intervals in the moving direction of the sliding board 52, and are formed into strips extending in a direction perpendicular to the moving direction. The opposing electrodes 57, 58 of the actuator 50 are aligned with each other in the moving direction of the sliding board 52.

The driving unit 20 is a circuit for driving the actuator 50, and is connected to the opposing electrodes 57, 58 through electric wiring. The driving unit 20 is identical in structure to that of the electromechanical transducer 1, and applies an alternating voltage to the opposing electrodes 57, 58, thereby reciprocating the sliding board 52 in a sliding fashion in the horizontal direction (direction of arrow A) inside the housing 51, as shown in FIGS. 10(B) and 10(C).

The electromechanical transducers 2, 3 may also include a pair of electret portions and opposing electrodes, not on both sides of the rotary member 12 or sliding board 52, but on only one side thereof, similarly to the actuators 10", 10'" shown in FIGS. 8(B) and 8(C).

FIGS. 11(A) to 11(D) are cross-sectional views of rotary members 12A', 12C, 12D, 12D', respectively. These figures show their cross sections, similarly to FIGS. 3(B) and 3(D). Instead of the rotary members 12A, 129 of FIGS. 3(A) to 3(D), the electromechanical transducers 1, 2 may include the rotary member 12A', 12C, 12D or 12D' as the rotary member 12. The electromechanical transducer 3 may also include a sliding board which is similar in structure to these rotary members, as the sliding board 52.

Figure 11:
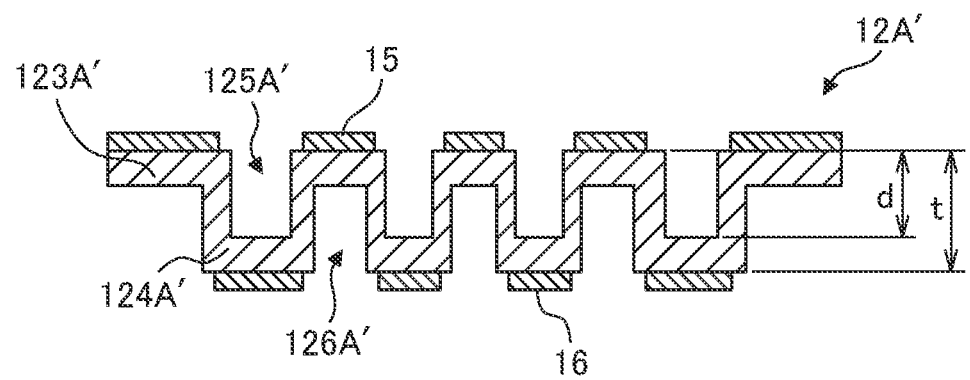
FIGS. 11(A) to 11(D) are cross-sectional views of rotary members 12A', 12C, 12D, 12D', respectively.
Figure 11:
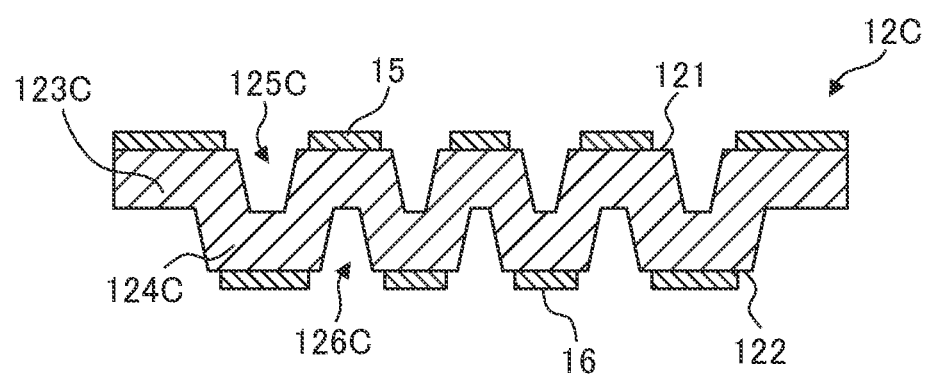
Figure 11:
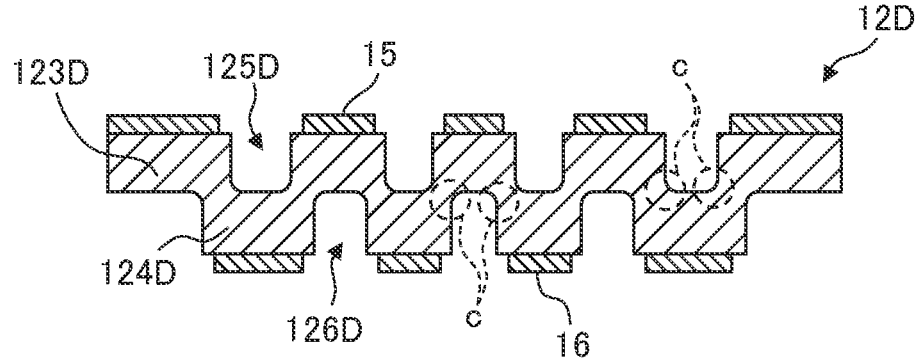
Figure 11:
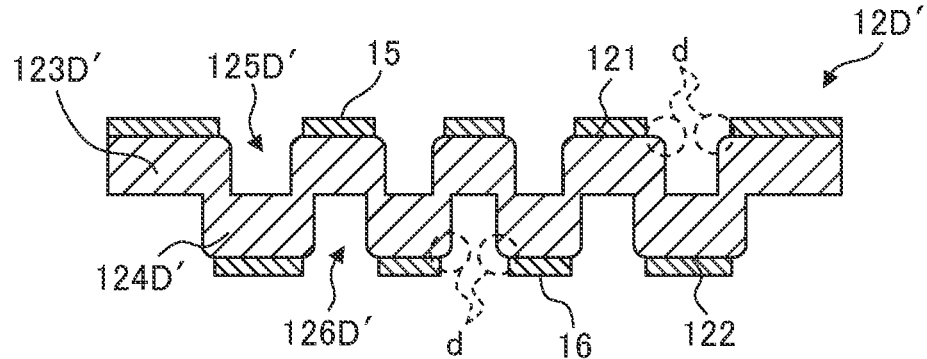

The rotary member 12A' of FIG. 11(A) includes bases 123A', 124A', grooves 125A', 126A' and electret portions 15, 16, which are similar to those of the rotary member 12A. Although the grooves 125A', 126A' do not penetrate the rotary member 12A' in the thickness direction, the depth d of the grooves is larger than one half of the thickness t of the substrate of the rotary member 12A'. Forming the grooves deeper than those of the rotary member 12A in this way allows for further weight reduction of the rotary member, while maintaining a certain degree of strength. For example, the depth of the grooves in one surface of the rotary member may be smaller than one half of the thickness t, while the depth of the grooves in the opposite surface thereof may be larger than one half of the thickness t; i.e., the grooves in the one surface may be formed deeper than those in the opposite surface. Further, it is not necessary for all the grooves in both surfaces to have the same depth; every groove may have a different depth.

The rotary member 12C of FIG. 11(B) includes bases 123C, 124C, grooves 125C, 126C and electret portions 15, 16, which are similar to those of the rotary member 12A. In a cross section of the rotary member 12C taken in the thickness direction thereof, the grooves 125C, 126C become wider from the center in the thickness direction toward the upper surface 121 and lower surface 122 of the rotary member 12C. In other words, the grooves 125C, 126C each have a trapezoidal (tapered) shape in a vertical cross section taken along the circumferential direction of the rotary member 12C; the grooves 125C, 126C have wider sides on the upper surface 121 side and lower surface 122 side, respectively. As in the rotary member 12C, the side surfaces of the bases 123C, 124C and grooves 125C, 126C may be inclined with respect to the upper surface 121 and lower surface 122 of the rotary member 12C.

The rotary member 12C has the characteristic that the electret portions 15, 16 are less likely to lose electrostatic charge and to deteriorate with time than the rotary members 12A-12B. However, since too inclined side surfaces of the bases and grooves reduce the area of the upper surfaces of the bases 123C, 124C for the electret portions 15, 16, the degree of inclination should be determined in consideration of required output of the electromechanical transducer. For example, the rotary member may include grooves having trapezoidal cross sections only on one surface side; the grooves having rectangular cross sections and grooves having trapezoidal cross sections may be mixed in a rotary member. Alternatively, every groove may have a different shape.

The rotary members 12D, 12D' of FIGS. 11(C) and 11(D) each have a shape similar to that of the rotary member 12A; however, portions indicated by reference numerals c, d have different shapes from those of the rotary member 12A. The corners c of grooves 125D, 126D of the rotary member 12D on the center side in the thickness direction thereof (i.e., bottom corners of the grooves, or the surfaces of portions connecting bases 123D, 124D to each other) have curved surfaces. The corners d of grooves 125D', 126D' of the rotary member 12D' on the upper surface 121 side and lower surface 122 side (corners of bases 123D', 124D') have curved surfaces.

Making the corners c, d of the groove have rounded surfaces in this way, without forming them into a pointed shape, such as a square, reduces stress on the rotary member, which improves the strength of the rotary member. The rotary member may include grooves having curved corners only on one surface side; grooves having rounded corners and grooves having pointed corners may be mixed in a rotary member. Alternatively, both corners c, d of the grooves may have curved surfaces in a rotary member.

The material of the rotary members is not limited to glass or silicon, but may be aluminum or its alloy, or stainless steel (SUS: special use stainless steel), for example. If these materials are used, the rotary member may be formed by electrical discharge machining, etching or stamping. In particular, if the rotary member is made of a metallic material, a metal having a small specific gravity is preferably used for the purpose of weight reduction. Even if a metallic material is used for the rotary member, the above-described shapes including bases and grooves alternately on both sides reduce warps and bends, and improves the strength of the rotary member. The same applies to the sliding board 52 of the electromechanical transducer 3.

The invention claimed is:

1. An electromechanical transducer using electrostatic interaction between charged portions and opposing electrodes to convert between electric power and motive power, the electromechanical transducer comprising:
   a movable member having first electrodes and first grooves in a first surface thereof and having second grooves in a second surface opposite to the first surface; and
   a fixed substrate having second electrodes and facing the first surface of the movable member,
   wherein one of the first electrodes and the second electrodes are charged portions carrying electrostatic charge while the other of the first electrodes and the second electrodes are opposing electrodes facing the charged portions, the first and second electrodes are each disposed at intervals in a moving direction of the movable member, and the first and second grooves do not penetrate the movable member in a thickness direction thereof and are alternately disposed in the moving direction, and
   wherein the movable member includes first bases which are portions between the first grooves in the first surface, and second bases which are portions between the second grooves in the second surface, the first electrodes are disposed on the first bases, and the first and second bases have edges connected to each other in the moving direction.

2. The electromechanical transducer according to claim 1, wherein at least one of the first grooves and the second grooves have a depth not less than one half of the thickness of the movable member.

3. The electromechanical transducer according to claim 1, wherein the movable member includes a center layer, first bases on the first surface of the center layer, and second bases on the second surface of the center layer, and the first electrodes are disposed on the first bases.

4. The electromechanical transducer according to claim 1, wherein at least one of the first grooves and the second grooves become wider from a center in the thickness direction toward an upper or lower surface of the movable member, in a cross section of the movable member taken along the thickness direction.

5. The electromechanical transducer according to claim 1, wherein at least one of the first grooves and the second grooves have curved corners.

6. The electromechanical transducer according to claim 1, wherein the movable member further has third electrodes on the second bases in the second surface, the electromechanical transducer further comprises a second fixed substrate facing the second surface of the movable member, the second fixed substrate having fourth electrodes disposed at intervals in the moving direction, and the first and third electrodes are the charged portions while the second and fourth electrodes are the opposing electrodes, or the first and third electrodes are the opposing electrodes while the second and fourth electrodes are the charged portions.

7. The electromechanical transducer according to claim 6, wherein the first and third electrodes are aligned with the second and first grooves, respectively, between both surfaces of the movable member.

8. The electromechanical transducer according to claim 1, wherein the movable member is a rotary member rotatable around a rotating shaft, and the charged portions and the opposing electrodes are radially disposed around the rotating shaft.

9. The electromechanical transducer according to claim 1, further comprising a driving unit applying an alternating voltage to the opposing electrodes to generate electrostatic force between the charged portions and the opposing electrodes, thereby moving the movable member.

10. The electromechanical transducer according to claim 1, further comprising a charging unit storing electric power generated by electrostatic induction between the charged portions and the opposing electrodes in response to movement of the movable member.

\* \* \* \* \*